(12) United States Patent
Shiau et al.

(10) Patent No.: US 11,221,969 B2
(45) Date of Patent: Jan. 11, 2022

(54) METHOD AND CONTROL CHIP FOR PERFORMING ACCESS CONTROL OF MEMORY DEVICE

(71) Applicant: Realtek Semiconductor Corp., HsinChu (TW)

(72) Inventors: Jiunn-Hung Shiau, Taipei (TW); Neng-Hsien Lin, Kaohsiung (TW); Cheng-Chang Chen, Taichung (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/994,688

(22) Filed: Aug. 17, 2020

(65) Prior Publication Data
US 2021/0064551 A1 Mar. 4, 2021

(30) Foreign Application Priority Data
Sep. 3, 2019 (TW) .................................. 108131654

(51) Int. Cl.
*G06F 9/451* (2018.01)
*G06F 12/1081* (2016.01)
(Continued)

(52) U.S. Cl.
CPC .......... *G06F 12/1458* (2013.01); *G06F 9/451* (2018.02); *G06F 12/1081* (2013.01);
(Continued)

(58) Field of Classification Search
CPC .. G06F 12/1458; G06F 9/451; G06F 12/1081; G06F 13/4022; G06F 13/4221; G06F 21/79; G06F 2221/2113
(Continued)

(56) References Cited

U.S. PATENT DOCUMENTS 7,624,216 B2 * 11/2009 Yoshikawa ........... G06F 13/387
710/301
7,941,185 B2 * 5/2011 Ban .................... H04M 1/72448
455/558
(Continued)

FOREIGN PATENT DOCUMENTS

CN 101295281 A 10/2008
TW I638266 B 10/2018
WO 2018/186457 A1 10/2018

*Primary Examiner* — Christopher B Shin
(74) *Attorney, Agent, or Firm* — Winston Hsu (57) ABSTRACT

A method and a control chip for performing access control of a memory device are provided, wherein the control chip is coupled to a host device. The method includes: utilizing a first transmission interface of the control chip to determine whether the memory device supports a second transmission interface different from the first transmission interface to generate a determination result; and according to user permissions of a user regarding the host device, determining whether to allow the control chip to decide whether to utilize the second transmission interface to access the memory device based on the determination result. In addition, if the user permissions satisfy a predetermined condition, a user interface of the host device may display a pop-up window in order to allow the user to decide which one of the first transmission interface and the second transmission interface to utilize for accessing the memory device.

13 Claims, 5 Drawing Sheets

(51) Int. Cl.
   *G06F 13/16*    (2006.01)
   *G06F 13/40*    (2006.01)
   *G06F 13/42*    (2006.01)
   *G06F 21/79*    (2013.01)
   *G06F 12/14*    (2006.01)

(52) U.S. Cl.
   CPC ...... *G06F 13/1694* (2013.01); *G06F 13/4022* (2013.01); *G06F 13/4221* (2013.01); *G06F 21/79* (2013.01); *G06F 2221/2113* (2013.01)

(58) Field of Classification Search
   USPC .......................................................... 711/163
   See application file for complete search history.

(56) References Cited

U.S. PATENT DOCUMENTS

| | | | |
|---|---|---|---|
| 8,307,143 B2 * | 11/2012 | Hirayama | G06F 13/385 |
| | | | 710/308 |
| 8,447,913 B2 | 5/2013 | Kelley | |
| 8,654,372 B2 * | 2/2014 | Ukegawa | G06F 8/65 |
| | | | 358/1.15 |
| 9,002,730 B2 * | 4/2015 | Postrel | G06Q 30/0259 |
| | | | 705/14.58 |
| 9,065,569 B2 * | 6/2015 | Phillips | H04B 17/29 |
| 9,218,298 B2 * | 12/2015 | Amemura | G06F 3/0683 |
| 9,712,636 B2 * | 7/2017 | Ito | G06K 19/07732 |
| 9,760,695 B2 * | 9/2017 | Manago | G06F 3/0679 |
| 9,940,049 B2 * | 4/2018 | Akiba | G06F 3/0632 |
| 9,979,924 B1 * | 5/2018 | Fink | H04W 4/90 |
| 10,803,447 B2 * | 10/2020 | Kim | G06K 7/10326 |
| 10,922,248 B2 * | 2/2021 | Kato | G06F 1/266 |
| 11,055,499 B2 * | 7/2021 | Inagaki | G06K 19/07733 |
| 2018/0276177 A1 * | 9/2018 | Shiau | G06F 13/4282 |

\* cited by examiner

METHOD AND CONTROL CHIP FOR PERFORMING ACCESS CONTROL OF MEMORY DEVICE

BACKGROUND OF THE INVENTION

1. Field of the Invention

The present invention is related to access control of memory devices, and more particularly, to a method and a control chip for performing access control of a memory device.

2. Description of the Prior Art

Peripheral Component Interconnect Express (PCIe) interfaces are general high speed interfaces used in electronic devices, which are reliable due to decades of development. A PCIe interface may be configured for communication between a system and peripheral devices. As it is scalable, the PCIe interface can also be applied to ports outside a case (e.g. a computer case), allowing some removable devices (e.g. external devices) to be connected with the system via the PCIe interface, so that the user can enjoy the benefit of the PCIe interface without needing to open the case. For example, an interface conforming to the ExpressCard specification configures the PCIe interface to be used by external devices.

Utilizing an external device equipped with the PCIe interface to perform a direct memory access (DMA) function is, however, a common and easy method for performing a computer attack (which may also be referred to as a DMA attack) or carrying out data theft. Even when a user has locked the screen, a modified device equipped with the PCIe interface can still be utilized to perform the DMA attack thereof to scan memory contents of the computer. Many prior arts are directed to the field of information security for trying to prevent this, where the simplest method is to remove the aforementioned external port conforming to the PCIe specification. Although this protects the user from unwanted DMA attacks, this also removes the advantages of using the PCIe interface. Thus, there is a need for a novel method and apparatus which can solve the problem of the related art.

SUMMARY OF THE INVENTION

An objective of the present invention is to provide a method and a control chip for performing access control of a memory device, to solve the problem of the trade-off between information security and performance; in particular, the advantages of a Peripheral Component Interconnect Express (PCIe) interface, such as transmission speed.

At least one embodiment of the present invention provides a method for performing access control of a memory device, the method being applicable to a control chip coupled to a host device. The method comprises: utilizing a first transmission interface of the control chip to determine whether the memory device supports a second transmission interface different from the first transmission interface to generate a determination result, wherein the second transmission interface is applicable to direct memory access (DMA); and according to the determination result, selectively displaying a pop-up window on a user interface coupled to the host device, in order to allow a user to decide which one of the first transmission interface and the second transmission interface to utilize for accessing the memory device.

At least one embodiment of the present invention provides a method for performing access control of a memory device, the method being applicable to a control chip coupled to a host device. The method comprises: utilizing a first transmission interface of the control chip to determine whether the memory device supports a second transmission interface different from the first transmission interface to generate a determination result, wherein the second transmission interface is applicable to DMA; and according to user permissions of a user regarding the host device, determining whether to allow the control chip to execute a control scheme, wherein the control scheme comprises: based on the determination result, determining whether to utilize the second transmission interface of the control chip to access the memory device.

At least one embodiment of the present invention provides a control chip for performing access control of a memory device. The control chip comprises a selection circuit, a first transmission interface and a second transmission interface different from the first transmission interface. The selection circuit is coupled to a host device, and the first transmission interface and the second transmission interface are coupled to the selection circuit, wherein the second transmission interface is applicable to DMA. When the control chip detects that the memory device is inserted, the control chip may utilize the first transmission interface to determine whether the memory device supports the second transmission interface, in order to generate a determination result. In addition, according to the determination result, the host device may selectively display a pop-up window on a user interface coupled to the host device, in order to allow a user to decide which one of the first transmission interface and the second transmission interface to utilize for accessing the memory device.

The present invention can establish a protection mechanism regarding DMA attacks with the aid of permissions management and/or a determination mechanism within an initialization procedure, which enables an electronic device (e.g. a personal computer) equipped with the PCIe interface to have the specific ability of preventing information security related attacks when a user (more particularly, a user having general information security concept) operates this electronic device. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
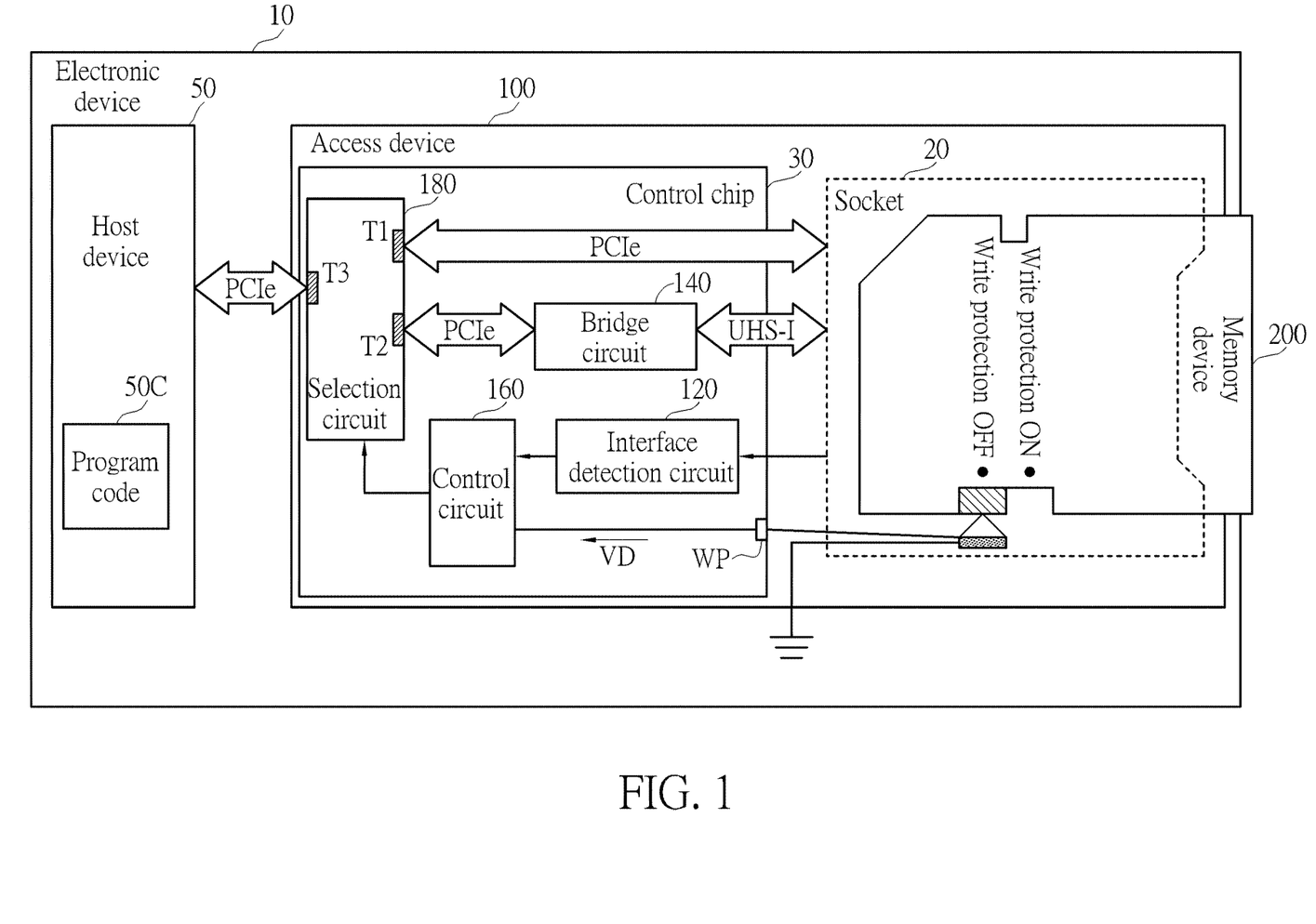
FIG. 1 is a diagram illustrating a memory device being inserted into an electronic device according to an embodiment of the present invention.

FIG. 1 is a diagram illustrating a memory device 200 being inserted into an electronic device 10 according to an embodiment of the present invention. In this embodiment, examples of the electronic device 10 may include, but are not limited to: a laptop computer, a tablet or a mobile phone, and the memory device 200 may be a memory card conforming to a secure digital (SD) specification, but the present invention is not limited thereto. The electronic device 10 comprises a host device 50 and an access device 100 (e.g. a card reader) coupled to the host device 50, where the host device 50 may control operations of the access device 100 according to a program code 50C (e.g. a program module of an operating system (OS) of the electronic device 10 and/or a driver program corresponding to the access device 100). In addition, the access device 100 may comprise a socket 20 and a control chip 30 coupled to the socket 20, where the socket 20 may be configured to connect the control chip 30 with the memory device 200 to thereby allow the host device 50 to access the memory device 200 through the control chip 30.

In this embodiment, the control chip 30 may comprise an interface detection module (such as an interface detection circuit 120), abridge circuit 140, a control circuit 160, a selection circuit 180 and a write protection detection terminal WP, wherein the interface detection circuit 120 and the write protection detection terminal WP are respectively coupled to the control circuit 160, and the control circuit 160 is further coupled to the selection circuit 180, but the present invention is not limited thereto. In addition, a set of first terminals T1 of the selection circuit 180 is coupled to the socket 20, and the bridge circuit 140 is coupled between a set of second terminals T2 of the selection circuit 180 and the socket 20. It should be noted that the set of first terminals T1 of the selection circuit 180 and the socket 20 perform data transmission according to a Peripheral Component Interconnect Express (PCIe) protocol (labeled "PCIe" on the corresponding bi-directional arrow in the figures). In addition, the set of second terminals T2 of the selection circuit 180 and the bridge circuit 140 perform data transmission according to the PCIe protocol (labeled "PCIe" on the corresponding bi-directional arrow in the figures); and the bridge circuit 140 and the socket 20 (more particularly, the memory device 200 inserted into the socket 20) perform data transmission according to an ultra-high speed (UHS) type-I (UHS-I) protocol different from the PCIe protocol (labeled "UHS-I" on the corresponding bi-directional arrow in the figures), where the bridge circuit 140 is configured to perform translation between the PCIe protocol and the UHS-I protocol, but the present invention is not limited thereto. In addition, the host device 50 is coupled to a set of third terminals T3 of the selection circuit 180, and performs data transmission with the control chip 30 according to the PCIe protocol.

The write protection detection terminal WP may be configured to monitor a write protection detection signal VD for detecting whether a write protection switch of the memory device 200 is turned on, to generate a write protection detection result, where the write protection detection terminal WP may be coupled to a pin of the control chip 30, in order to provide the control chip 30 with the write protection detection signal VD. In some embodiments, the write protection switch may be turned on, and a voltage level of the write protection detection signal VD is maintained at a default voltage level (e.g. 3.3V); in the embodiment shown in FIG. 1, as the write protection switch is turned off, the voltage level of the write protection detection signal VD may be pulled to a voltage level (e.g. a ground voltage level) different from the default voltage level. The write protection detection terminal WP may generate the write protection detection result by monitoring the voltage level of the write protection detection signal VD. In these embodiments, the voltage level of the write protection detection signal VD may vary according to the selected socket 20, and the implementation of pulling down the voltage level of the write protection detection signal VD to the ground voltage level is one implementation only, but the present invention is not limited thereto. For better comprehension, the following embodiments of the present invention assume that the write protection switch is turned off, but the present invention is not limited thereto.

The interface detection circuit 120 may detect whether the memory device 200 supports a first protocol such as the PCIe protocol, to generate an interface detection result. It should be noted that the block diagram of the interface detection circuit 120 depicted in this embodiment is for illustrative purposes only, and is not a limitation of the present invention. In some embodiments, the interface detection circuit 120 may be implemented as a portion of the control circuit 160, or the interface detection circuit 120 and the control circuit 160 may be implemented as a portion of the selection circuit 180, but the present invention is not limited thereto. In addition, the interface detection circuit 120 is not limited to being implemented by hardware or software (e.g. taking an interface signal as a determination condition), and any implementation which can assist the access device 100 to detect whether the memory device 200 supports the first protocol belongs to the scope of the present invention. In addition, the control chip 30 comprises a first transmission interface (e.g. a UHS-I interface) and a second transmission interface (e.g. a transmission interface that is applicable to direct memory access (DMA), such as a PCIe interface) different from the first transmission interface, where the UHS-I interface is coupled to the selection circuit 180 (more particularly, the set of second terminals T2 of the selection circuit 180) via the bridge circuit 140, and the PCIe interface is coupled to the selection circuit 180 (more particularly, the set of first terminals T1 of the selection circuit 180) via a bypass path without any bridge circuit. As the first transmission interface (e.g. the UHS-I interface) needs to perform DMA (e.g. perform DMA according to the PCIe protocol) via the bridge circuit 140, the first transmission interface (e.g. the UHS-I interface) is less likely to undergo the DMA attack from outside or external devices in comparison with the second transmission interface, which has the PCIe interface installed on the outside of the device (e.g. outside of the control chip 30, outside of the access device 100, or outside of the electronic device 10).

For brevity, block diagrams of the first transmission interface and the second transmission interface are not depicted, but the data transmission utilizing the PCIe interface and the UHS-I interface are represented by the arrows labeled "PCIe" and "UHS-I", respectively. It should be noted that no matter which manner is utilized to implement the aforementioned function of the interface detection module, the control chip 30 may utilize the UHS-I interface to receive a signal for determining whether the memory device 200 supports the first protocol during an initialization procedure.

Figure 2:
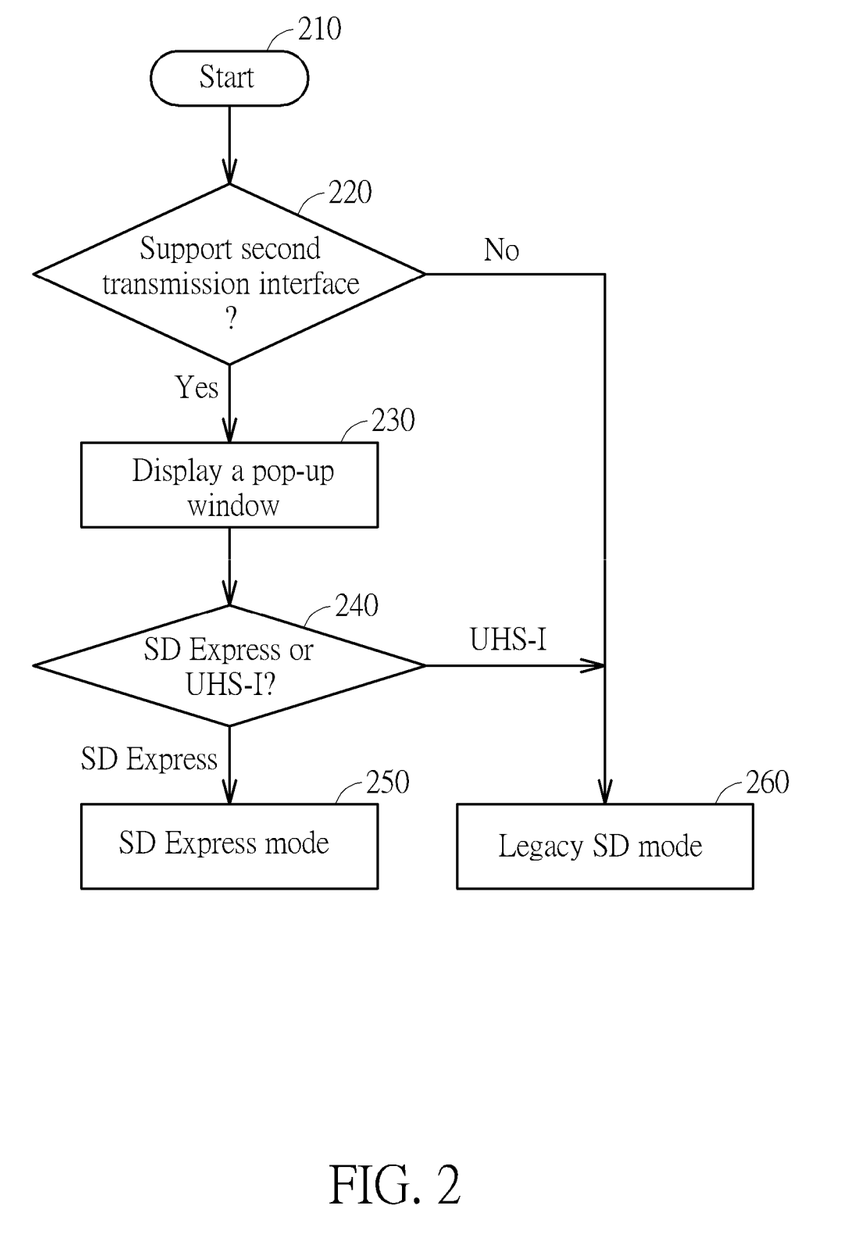
FIG. 2 is a flowchart illustrating a method for performing access control of a memory device according to an embodiment of the present invention.

FIG. 2 is a flowchart illustrating a method for performing access control of a memory device according to an embodiment of the present invention, where the method is applicable to a control chip coupled to a host device, such as the control chip 30 shown in FIG. 1. It should be noted that one or more steps shown in FIG. 2 may be added, deleted and/or modified if the overall result is not affected, and the one or more steps do not have to be executed in the order shown in FIG. 2. For better comprehension, refer to FIG. 2 in conjunction with FIG. 1.

In Step 210, a user inserts the memory device 200 into the access device 100 of the electronic device 10, and the flow starts.

In Step 220, when the control chip 30 detects that memory card (e.g. the memory device 200) is inserted, the control chip 30 may utilize the first transmission interface (e.g. the UHS-I interface) to determine whether the memory device 200 supports the second transmission interface (e.g. the PCIe interface) in order to generate a determination result, e.g. utilizing the first transmission interface to receive related information from the memory device 200 for determining whether the memory device 200 supports the second transmission interface. If yes, the flow enters Step 230; otherwise, the flow enters Step 260.

Figure 3:
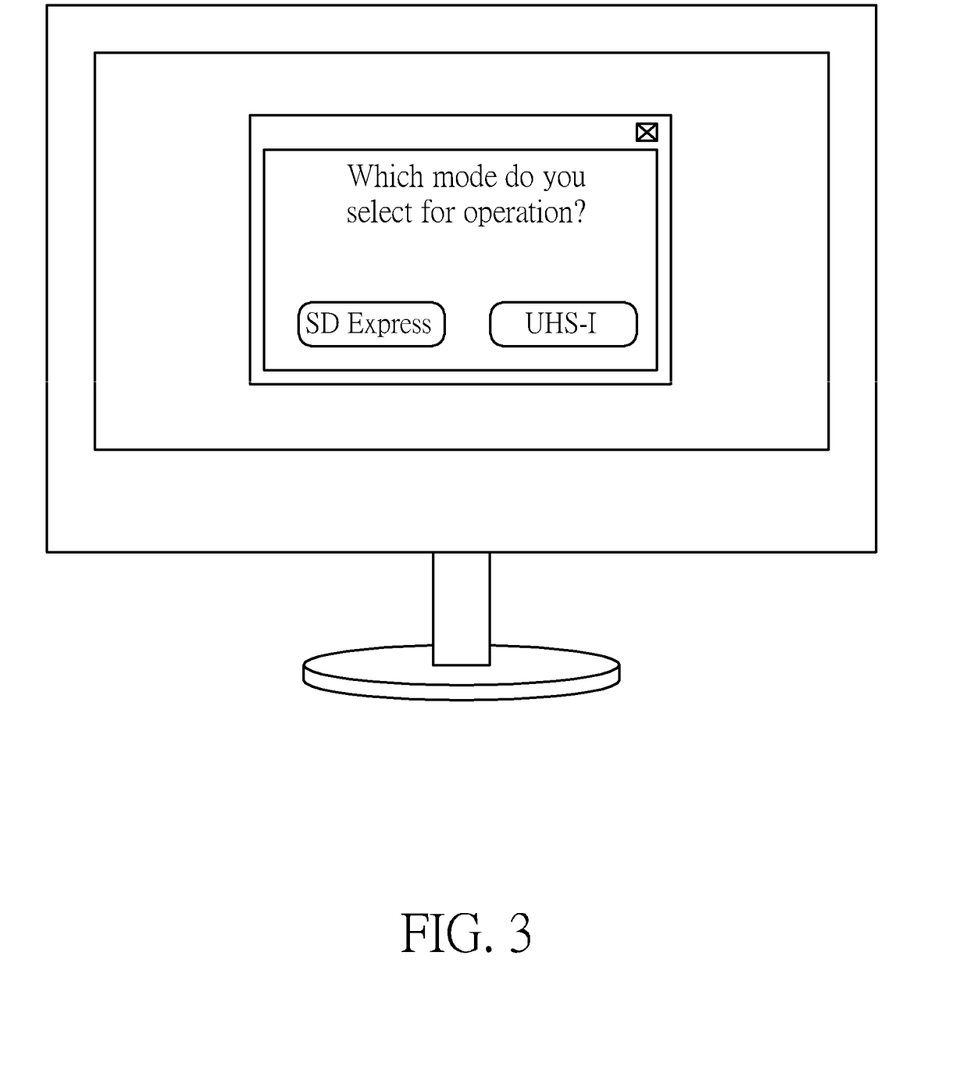
FIG. 3 is a diagram illustrating a pop-up window according to an embodiment of the present invention.

In Step 230, a user interface (e.g. a display device coupled to a personal computer) coupled to the host device 50 (e.g. the personal computer) may display a pop-up window as shown in FIG. 3, in order to allow the user to decide which one of the first transmission interface and the second transmission interface to utilize for accessing the memory device 200.

In Step 240, the user may utilize the pop-up window to select which one of the first transmission interface and the second transmission interface to utilize for accessing the memory device 200. If the user selects the second transmission interface such as the PCIe interface (e.g. by pushing the button labeled "SD Express" in FIG. 3), the flow enters Step 250; if the user selects the first transmission interface such as the UHS-I interface (e.g. by pushing the button labeled "UHS-I" in FIG. 3), the flow enters Step 260. In one embodiment of present invention, the "SD Express" in FIG. 3 means using the PCIe interface for data transmission.

In Step 250, as the memory device supports the second transmission interface, and the user selects the second transmission interface, the selection circuit 180 may couple the set of third terminals T3 to the set of first terminals T1 in order to utilize the second transmission interface (e.g. the PCIe interface) to access the memory device 200, e.g. initializing as the SD Express mode. It should be noted that, before entering Step 250, the selection circuit 180 couples the set of third terminals T3 to the set of second terminals T2 by default (e.g. the control chip 30 utilizes the first transmission interface (e.g. the UHS-I interface) to access the memory device 200), but the present invention is not limited thereto.

In Step 260, the selection circuit may continue coupling the set of third terminals T3 to the set of second terminals T2 in order to utilize the first transmission interface (e.g. the UHS-I interface) to access the memory device 200, e.g. initializing as the legacy SD mode. For example, the memory device 200 might not support the second transmission interface, and the selection circuit 180 may directly utilize the first transmission interface to access the memory device 200 (e.g. enter Step 260 from Step 220); in another example, although the memory device supports the second transmission interface, the user selects the first transmission interface, so the selection circuit 180 still utilizes the first transmission interface to access the memory device 200, rather than utilizing the second transmission interface (e.g. enter Step 260 from Step 240).

The method shown in FIG. 2 utilizes the feature of the control chip 30 utilizing a relatively secure (i.e. one which is less likely to suffer from DMA attacks) transmission interface (e.g. the UHS-I interface) to access the memory device 200, and implements the protection mechanism regarding DMA attacks with the aid of the initialization procedure for accessing the memory device 200. For example, a user (more particularly, a user having general information security concept) will typically lock a screen of a personal computer if the computer must be left alone for a short time, where unlocking the screen may need a specific method such as keying in specific code (s). Under this situation, if anyone is going to utilize a modified electronic device to connect to an external PCIe interface of this computer to steal data, this person will not be able to press the button in the pop-up window to select the SD Express mode as the method for unlocking the screen is unknown, and this person is therefore unable to steal data through the aforementioned access device supporting the PCIe protocol. The case of the computer therefore has to be opened in order to connect the internal PCIe interface, which increases the time required, thereby making it more difficult to steal data. In another example, when a user (more particularly, a user having general information security concept) is going to access a memory device which is not trusted via the personal computer, this user can select the first transmission interface to access this memory device, in order to prevent this memory device from being directly connected to the PCIe interface of this personal computer.

Figure 4:
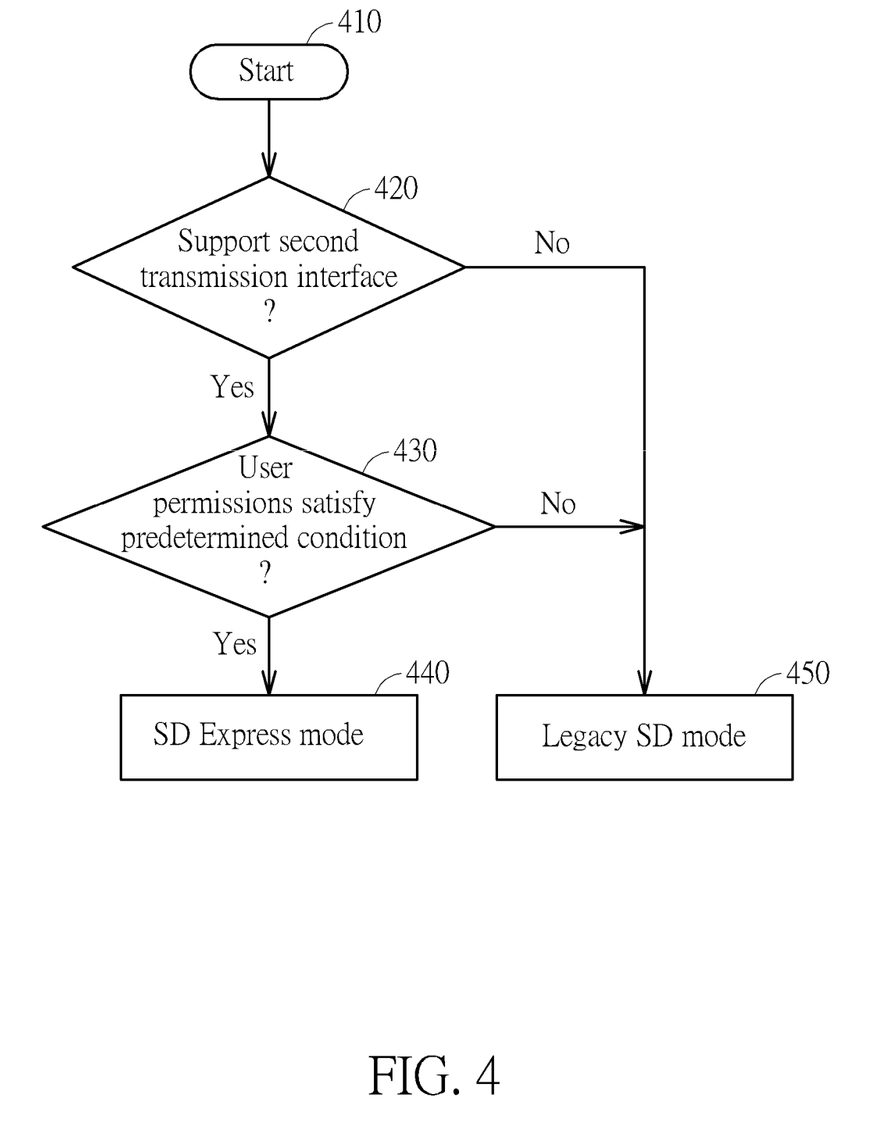
FIG. 4 is a flowchart illustrating a method for performing access control of a memory device according to another embodiment of the present invention.

FIG. 4 is a flowchart illustrating a method for performing access control of a memory device according to another embodiment of the present invention, where the method is applicable to a control chip coupled to a host device, such as the control chip 30 shown in FIG. 1. It should be noted that one or more steps shown in FIG. 4 may be added, deleted and/or modified if the overall result is not affected, and the one or more steps do not have to be executed in the order shown in FIG. 4. For better comprehension, refer to FIG. 4 in conjunction with FIG. 1.

In Step 410, a user inserts the memory device 200 into the access device 100 of the electronic device 10, and the flow starts.

In Step 420, when the control chip 30 detects that any memory card (e.g. the memory device 200) is inserted, the control chip 30 may utilize the first transmission interface (e.g. the UHS-I interface) to determine whether the memory device 200 supports the second transmission interface (e.g. the PCIe interface), to generate a determination result, e.g. utilizing the first transmission interface to receive related information from the memory device 200 for determining whether the memory device 200 supports the second transmission interface. If yes, the flow enter Step 430; otherwise, the flow enters Step 450.

In Step 430, the host device 50 may determine whether user permissions (e.g. access rights) of a user (e.g. a current login user) regarding the host device 50 (e.g. a personal computer of the user) satisfy a predetermined condition, and according to whether the user permissions of the user regarding the host device 50 satisfy the predetermined condition, the host device 50 may determine whether to allow the selection circuit 180 to execute a control scheme, where the control scheme comprises: based on the determination result, determining whether to utilize the second transmission interface to access the memory device 200. If the user permissions of the user regarding the host device 50 satisfy the predetermined condition, the flow enters Step 440; otherwise, the flow enters Step 450.

In Step 440, as the memory device 200 supports the second transmission interface, and the user permissions of the user regarding the host device 50 satisfy the predetermined condition, the selection circuit 180 may couple the set of third terminals T3 to the set of first terminals T1, in order to utilize the second transmission interface (e.g. the PCIe interface) to access the memory device 200, e.g. initializing as the SD Express mode. It should be noted that, before the flow enters Step 440, the selection circuit 180 couples the set of third terminals T3 to the set of second terminals T2 by default (e.g. the control chip 30 utilizes the first transmission interface (e.g. the USH-I interface) to access the memory device 200 by default), but the present invention is not limited thereto.

In Step 450, the selection circuit 180 may continue coupling the set of third terminals T2 to the set of second terminals T2, in order to utilize the first transmission interface (e.g. the UHS-I interface) to access the memory device 200, e.g. initializing as the legacy SD mode. For example, when the memory device 200 does not support the second transmission interface, the selection circuit 180 directly utilizes the first transmission interface to access the memory device 200 (e.g. the flow enters Step 450 from Step 420); in another example, although the memory device 200 supports the second transmission interface, but the user permissions of the user regarding the host device 50 do not satisfy the predetermined condition, the selection circuit 180 still utilizes the first transmission interface to access the memory device 200, rather than utilizing the second transmission interface (e.g. the flow enters Step 450 from Step 430).

The method shown in FIG. 4 utilizes a computer organization management principle to limit operations of different users regarding a computer, and more particularly, to limit a user having less user permissions to be unable to utilize the PCIe interface for accessing an external electronic device (e.g. an external memory device). For example, when a user signs in to a personal computer by an account having highest permissions, the control chip 30 may decide which one of the first transmission interface and the second transmission interface to utilize for accessing an inserted memory device directly according to whether the inserted memory device supports the second transmission interface; in another example, when a user is going to switch to an operation mode corresponding to the second transmission interface, this user may key in a set of codes to obtain specific permissions in order to utilize the second transmission interface for accessing a memory device when this memory device supports the second transmission interface. In yet another example, when a user does not have sufficiently permissions, and does not have the set of codes for obtaining the specific permissions, regardless of whether a memory device inserted into the access device 100 supports the second transmission interface, the control chip 30 may utilize the first transmission interface to access this memory device.

Figure 5:
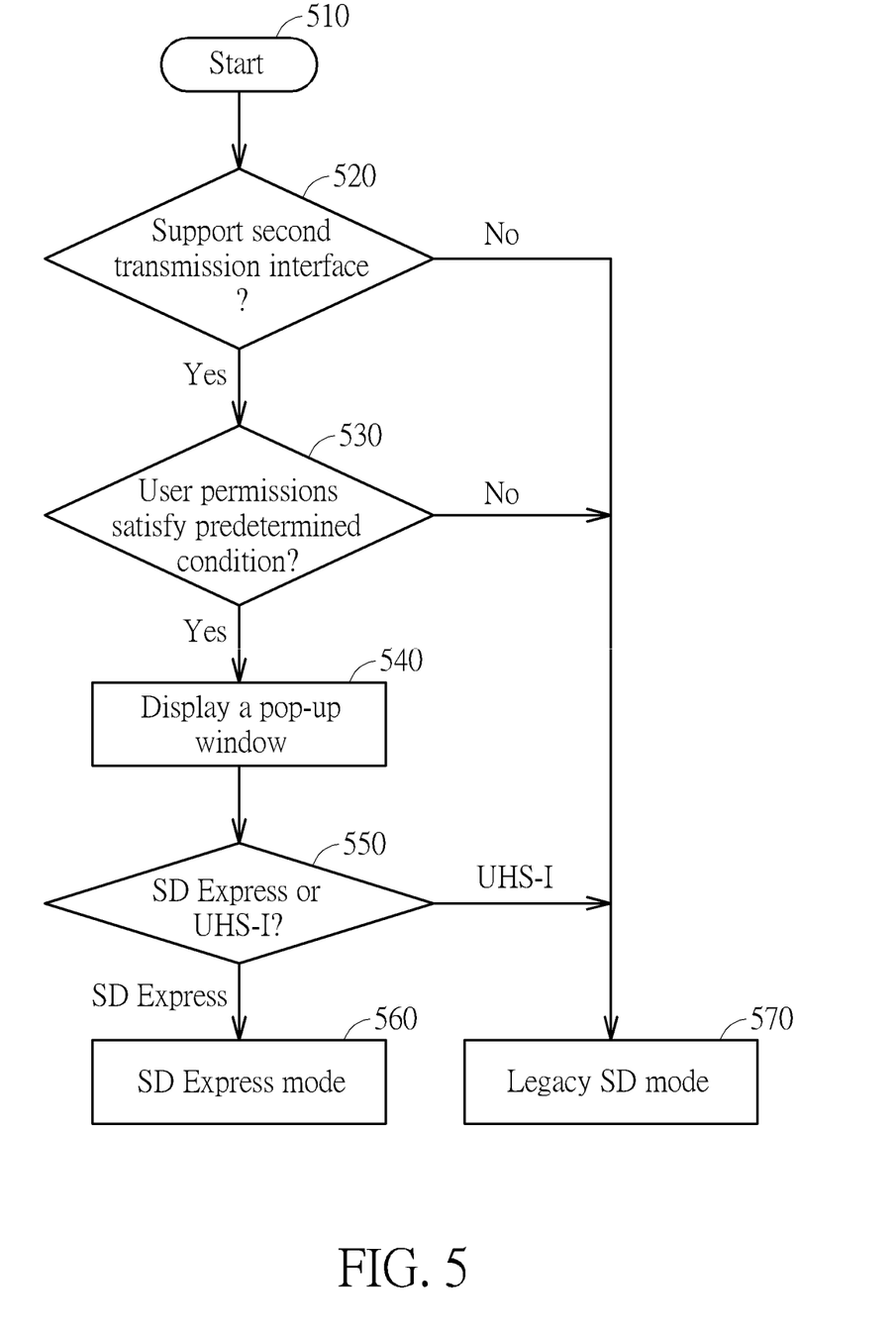
FIG. 5 is a flowchart illustrating a method for performing access control of a memory device according to yet another embodiment of the present invention.

FIG. 5 is a flowchart illustrating a method for performing access control of a memory device according to yet another embodiment of the present invention, where the method is applicable to a control chip coupled to a host device, such as the control chip 30 shown in FIG. 1, and the method shown in FIG. 5 may be regarded as a combination of the method shown in FIG. 2 and the method shown in FIG. 4. It should be noted that one or more steps shown in FIG. 5 may be added, deleted and/or modified if the overall result is not affected, and the one or more steps do not have to be executed in the order shown in FIG. 5. For better comprehension, refer to FIG. 5 in conjunction with FIG. 1.

In Step 510, a user inserts the memory device 200 into the access device 100 of the electronic device 10, and the flow starts.

In Step 520, when the control chip 30 detects that any memory card (e.g. the memory device 200) is inserted, the control chip 30 may utilize the first transmission interface (e.g. the UHS-I interface) to determine whether the memory device 200 supports the second transmission interface (e.g. the PCIe interface), to generate a determination result, e.g. utilizing the first transmission interface to receive related information from the memory device 200 for determining whether the memory device supports the second transmission interface. If yes, the flow enters Step 530; otherwise, the flow enters Step 570.

In Step 530, the host device 50 may determine whether user permissions of a user (e.g. a current login user) regarding the host device 50 (e.g. a personal computer of the user) satisfy a predetermined condition, and according to the user permissions of the user regarding the host device 50 (e.g. whether the user permissions of the user regarding the host device 50 satisfy the predetermined condition), the host device 50 may determine whether to allow the selection circuit 180 to execute a control scheme, where the control scheme comprises: based on the determination result, determining whether to utilize the second transmission interface to access the memory device 200. If the user permissions of the user regarding the host device 50 satisfy the predetermined condition, the flow enters Step 540; otherwise, the flow enters Step 570.

In Step 540, a user interface coupled to the host device 50 (e.g. a display device connected with the personal computer) may display a pop-up window as shown in FIG. 3, in order to allow the user to decide which one of the first transmission interface and the second transmission interface to utilize for accessing the memory device 200.

In Step 550, the user may utilize the pop-up window to select which one of the first transmission interface and the second transmission interface to utilize for accessing the memory device 200. If the user selects the second transmission interface such as the PCIe interface (e.g. by pushing the button labeled "SD Express" in FIG. 3), the flow enters Step 560; if the user selects the first transmission interface such as the UHS-I interface (e.g. by pushing the button labeled "UHS-I" in FIG. 3), the flow enters Step 570.

In Step 560, as the memory device 200 supports the second transmission interface, the user permissions of the user regarding the host device 50 satisfy the predetermined condition and the user selects the second transmission interface, the selection circuit 180 may couple the set of third terminals T3 to the set of first terminals T1, in order to utilize the second transmission interface (e.g. the PCIe interface) to access the memory device 200, e.g. initializing as the SD Express mode. It should be noted that, before the flow enters Step 560, the selection circuit couples the set of third terminals T3 to the set of second terminals T2 by default (e.g. the control chip utilizes the first transmission interface (e.g. the UHS-I interface) to access the memory device 200 by default), but the present invention is not limited thereto.

In Step 570, the selection circuit 180 may continue coupling the set of third terminals T3 to the set of second terminals in order to utilize the first transmission interface (e.g. the UHS-I interface) to access the memory device 200, e.g. initializing as the legacy SD mode. For example, when the memory device does not support the second transmission interface, the selection circuit 180 may directly utilize the first transmission interface to access the memory device 200 (e.g. the flow enters Step 570 from Step 520); in another example, although the memory device 200 supports the second transmission interface, but the user permissions of the user regarding the host device 50 do not satisfy the predetermined condition, the selection circuit 180 still utilizes the first transmission interface to access the memory device 200 (e.g. the flow enters Step 570 from Step 530); in yet another example, although the memory device 200 supports the second transmission interface and the user permissions of the user regarding the host device 50 satisfy the predetermined condition, the user may select to utilize the first transmission interface because the memory device 200 is not trusted. The selection circuit 180 therefore still utilizes the first transmission interface to access the memory device 200, rather than utilizing the second transmission interface (e.g. the flow enters Step 570 from Step 550).

The method shown in FIG. 5 selectively gives permissions of selecting operation modes to a user according to the computer organization management principle. If user permissions of a user regarding the host device 50 satisfy the predetermined condition (e.g. the permissions are high enough), the user may select one of the aforementioned SD Express mode and legacy SD mode for operations; and if the user permissions of the user regarding the host device 50 do not satisfy the predetermined condition (e.g. the permissions are not high enough), the user can simply utilize the legacy SD mode for operation. Note that, the steps in the methods shown above are not recited in the sequence in which the operations are performed. That is, unless the sequence of the operations is expressly indicated, the sequence of the steps is interchangeable, and all or part of the steps may be simultaneously, partially simultaneously, or sequentially performed.

To summarize, the present invention provides a method and a control chip for performing access control of a memory device, which utilizes the procedure of initialization of an SD card and/or the computer organization management principle to implement an access control mechanism that is less likely to suffer from DMA attacks. According to embodiments of the present invention, a user can experience the advantages of using the PCIe interface without information security concerns. The architecture of the control chip provided by the present invention can allow a person to avoid DMA attacks while only requiring a basic concept of information security. In addition, the embodiments of the present invention will not greatly increase additional costs, so the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access control of a memory device, the method being applicable to a control chip coupled to a host device, the method comprising:
utilizing a first transmission interface of the control chip to determine whether the memory device supports a second transmission interface different from the first transmission interface to generate a determination result, wherein data transmission between the host device and the control chip is performed according to a first protocol; and
according to the determination result, selectively displaying a pop-up window on a user interface coupled to the host device, in order to allow a user to decide which one of the first transmission interface and the second transmission interface to utilize for accessing the memory device;
wherein:
when the first transmission interface is utilized, data transmission between the control chip and the memory device is performed according to a second protocol which is different from the first protocol; and
when the second transmission interface is utilized, data transmission between the control chip and the memory device is performed according to the first protocol.

2. The method of claim 1, wherein the step of selectively displaying the pop-up window on the user interface coupled to the host device according to the determination result in order to allow the user to decide which one of the first transmission interface and the second transmission interface to utilize for accessing the memory device comprises:
in response to the determination result indicating that the memory device does not support the second transmission interface, directly utilizing the first transmission interface to access the memory device.

3. The method of claim 1, wherein the step of selectively displaying the pop-up window on the user interface coupled to the host device according to the determination result in order to allow the user to decide which one of the first transmission interface and the second transmission interface to utilize for accessing the memory device comprises:
in response to the determination result indicating that the memory device supports the second transmission interface, displaying the pop-up window on the user interface coupled to the host device, in order to allow the user to decide which one of the first transmission interface and the second transmission interface to utilize for accessing the memory device.

4. The method of claim 1, wherein the memory device is a memory card conforming to a secure digital (SD) specification, the first transmission interface is an ultra-high speed (UHS) type-I (UHS-I) interface, and the second transmission interface is a Peripheral Component Interconnect Express (PCIe) interface.

5. A method for performing access control of a memory device, the method being applicable to a control chip coupled to a host device, the method comprising:
utilizing a first transmission interface of the control chip to determine whether the memory device supports a second transmission interface different from the first transmission interface to generate a determination result, wherein data transmission between the host device and the control chip is performed according to a first protocol; and
according to user permissions of a user regarding the host device, determining whether to allow the control chip to execute a control scheme, wherein the control scheme comprises: based on the determination result, determining whether to utilize the second transmission interface of the control chip to access the memory device;
wherein:

when the first transmission interface is utilized, data transmission between the control chip and the memory device is performed according to a second protocol which is different from the first protocol; and when the second transmission interface is utilized, data transmission between the control chip and the memory device is performed according to the first protocol.

6. The method of claim 5, wherein the step of determining whether to allow the control chip to execute the control scheme according to the user permissions of the user regarding the host device comprises:

in response to the user permissions not satisfying a predetermined condition, directly utilizing the first transmission interface to access the memory device.

7. The method of claim 5, wherein the step of determining whether to allow the control chip to execute the control scheme according to the user permissions of the user regarding the host device comprises:

in response to the user permissions satisfying a predetermined condition and the determination result indicating that the memory device does not support the second transmission interface, utilizing the first transmission interface to access the memory device.

8. The method of claim 5, wherein the step of determining whether to allow the control chip to execute the control scheme according to the user permissions of the user regarding the host device comprises:

in response to the user permissions satisfying a predetermined condition and the determination result indicating that the memory device supports the second transmission interface, utilizing the second transmission interface to access the memory device.

9. The method of claim 5, wherein the step of determining whether to allow the control chip to execute the control scheme according to the user permissions of the user regarding the host device comprises:

in response to the user permissions satisfying a predetermined condition, selectively displaying a pop-up window on a user interface coupled to the host device based on the determination result, in order to allow the user to decide which one of the first transmission interface and the second transmission interface to utilize for accessing the memory device.

10. The method of claim 5, wherein the memory device is a memory card conforming to a secure digital (SD) specification, the first transmission interface is an ultra-high speed (UHS) type-I (UHS-I) interface, and the second transmission interface is a Peripheral Component Interconnect Express (PCIe) interface.

11. A control chip for performing access control of a memory device, comprising:

a selection circuit, coupled to a host device;

a first transmission interface, coupled to the selection circuit; and a second transmission interface different from the first transmission interface, coupled to the selection circuit, wherein data transmission between the host device and the control chip is performed according to a first protocol;

wherein when the control chip detects that the memory device is inserted, the control chip utilizes the first transmission interface to determine whether the memory device supports the second transmission interface to generate a determination result, and according to the determination result, the host device selectively displays a pop-up window on a user interface coupled to the host device, in order to allow a user to decide which one of the first transmission interface and the second transmission interface to utilize for accessing the memory device;

wherein:

when the first transmission interface is utilized, data transmission between the control chip and the memory device is performed according to a second protocol which is different from the first protocol; and when the second transmission interface is utilized, data transmission between the control chip and the memory device is performed according to the first protocol.

12. The control chip of claim 11, wherein:

when the determination result indicates that the memory device does not support the second transmission interface, the selection circuit directly utilizes the first transmission interface to access the memory device; and when the determination result indicates that the memory device supports the second transmission interface, the host device displays the pop-up window on the user interface coupled to the host device, in order to allow the user to decide which one of the first transmission interface and the second transmission interface to utilize for accessing the memory device.

13. The control chip of claim 11, wherein the memory device is a memory card conforming to a secure digital (SD) specification, the first transmission interface is an ultra-high speed (UHS) type-I (UHS-I) interface, and the second transmission interface is a Peripheral Component Interconnect Express (PCIe) interface.

* * * * *